ns

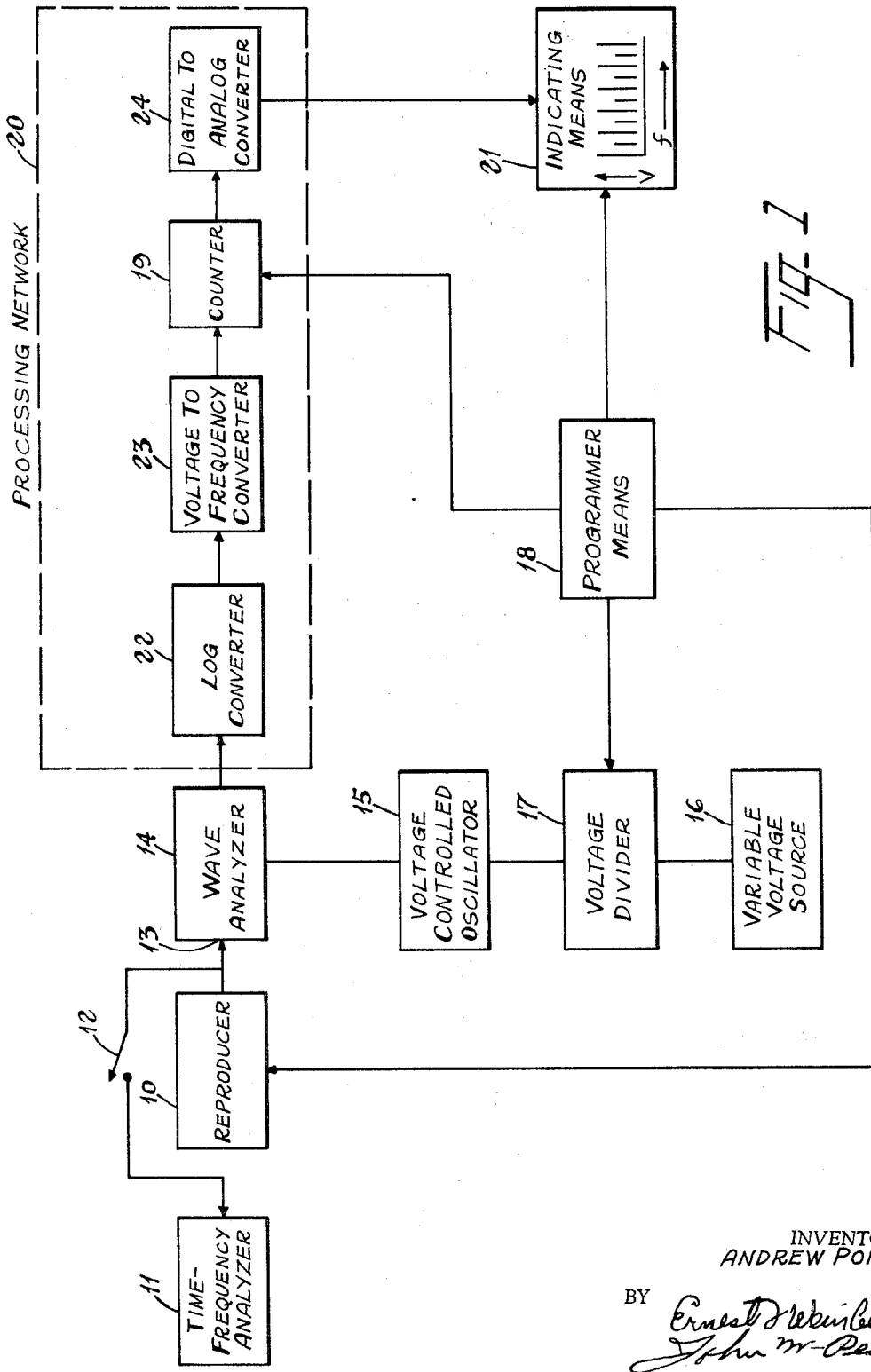

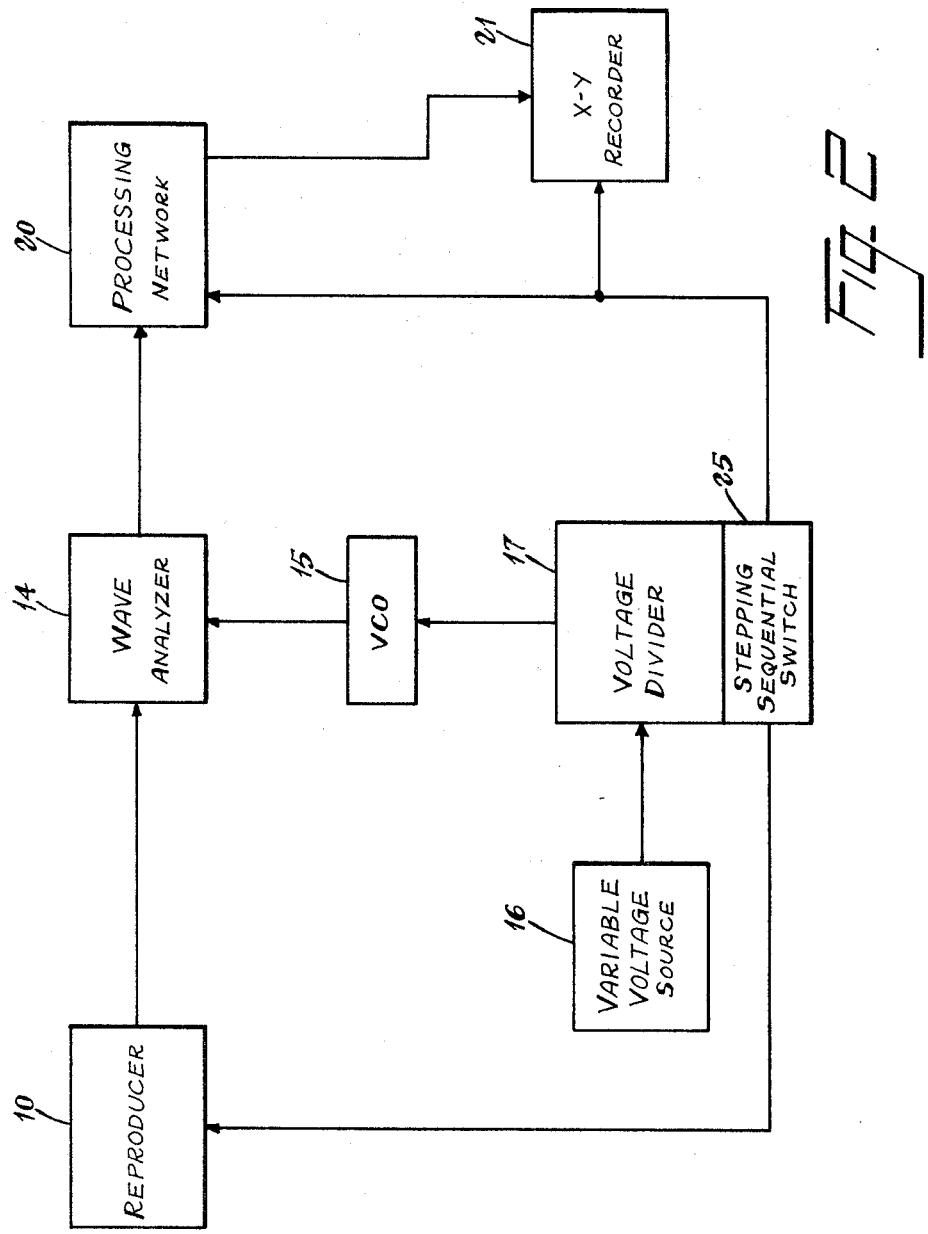

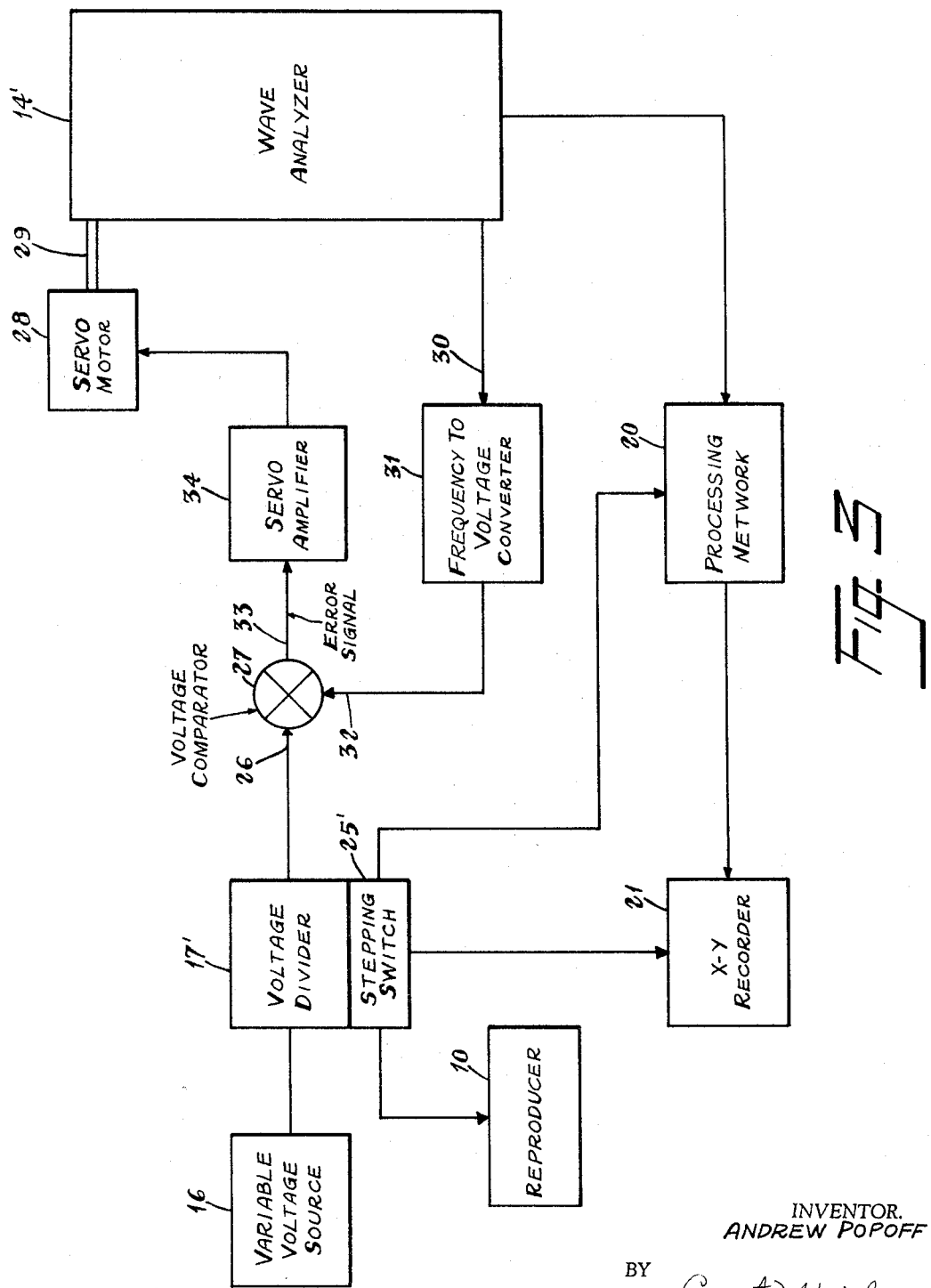

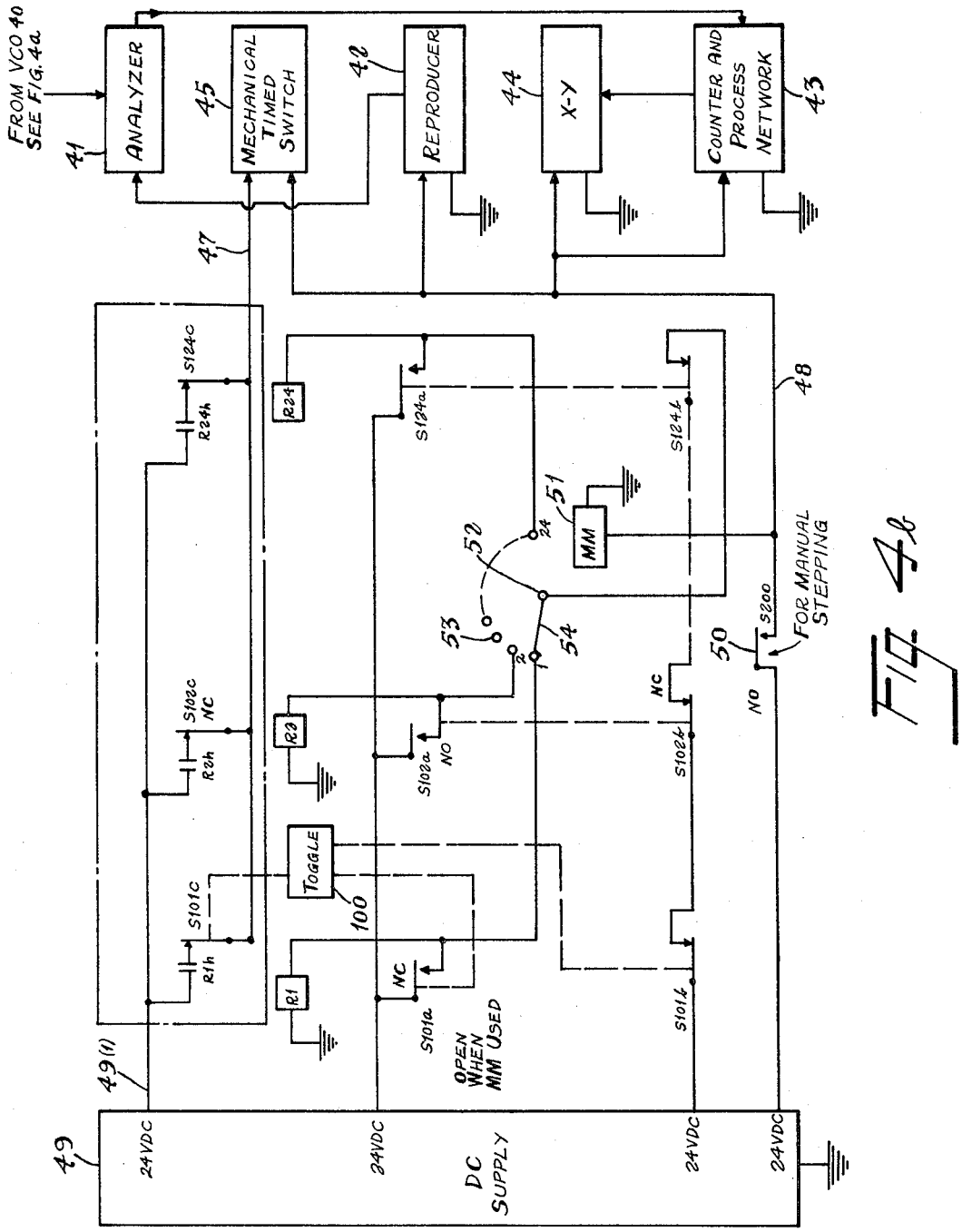

United States Patent Office 3,436,657
Patented Apr. 1, 1969

3,436,657
APPARATUS FOR HARMONIC ANALYSIS OF A COMPLEX WAVEFORM
Andrew Popoff, Rochester, N.Y., assignor to the United States of America as represented by the Secretary of the Navy
Filed Feb. 15, 1966, Ser. No. 529,177
Int. Cl. G01r *23/16, 27/02*
U.S. Cl. 324—77                                    1 Claim

ABSTRACT OF THE DISCLOSURE

A harmonic analyzer for complex waveforms which includes apparatus for periodically reproducing said complex waveform and applying the same to an IF tuned harmonic analyzer, whose input includes a VCO to which is supplied a step voltage. The output of the analyzer is log converted, frequency converted, counted and converted to an analog signal at an indicator. A programmer synchronizes the counting, start of the complex signal, the step voltage and the deflection of the indicator.

---

The invention described herein may be manufactured and used by or for the Government of the United States of America for governmental purposes without the payment of any royalties thereon or therefor.

This invention relates to electronic wave analyzers employed for the measurement of the amplitude levels of the harmonic components of complex waveform signals and more particularly to automatic wave analyzers.

Presently designed wave analyzers which are well known in the art are in most instances of the heterodyne type. Namely, the signal to be analyzed is combined or mixed with a selectable frequency generated by an oscillator. The resultant output is applied to a tuned circuit such as a filter or tuned amplifier and the sum or difference products are passed therethrough. The frequency passed by the amplifier can be referred to as the IF and generally it is higher than the highest harmonic to be measured. The selectable frequency of the oscillator is adjusted so that either the difference or sum output remains constant and equal to the IF of the amplifier. Each harmonic component of the complex signal is obtained individually by having its frequency shifted to that of the tuned amplifier by varying the oscillator, and the amplitude thereof indicated. Clearly this manual method of measurement is both tedious, and time consuming since a single complex signal may contain hundreds of harmonics. This is especially true when one is dealing with the harmonics of complex sound waves.

Accordingly it is an object of this invention to provide a reliable, accurate, inexpensive apparatus and method to automatically and sequentially tune an analyzer to and for selected harmonics of an input signal.

A further object is to provide an integrated system for automatically and in programmed sequence to measure the amplitude at selected frequencies of an input complex waveform signal.

Other objects and advantages will appear from the following description of an example of the invention, and the novel features will be particularly pointed out in the appended claims.

Figure 4A:
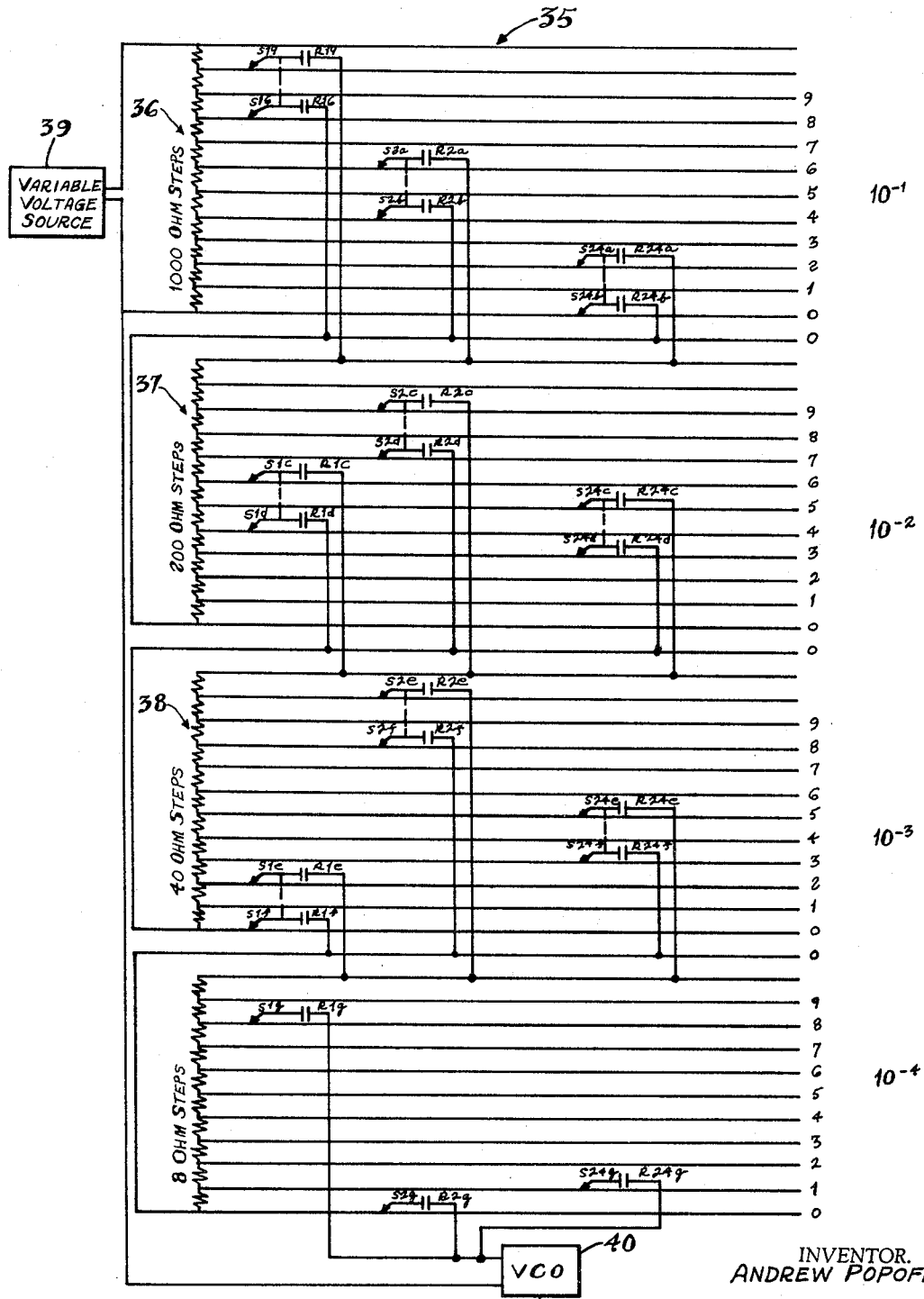
Figure 4C:
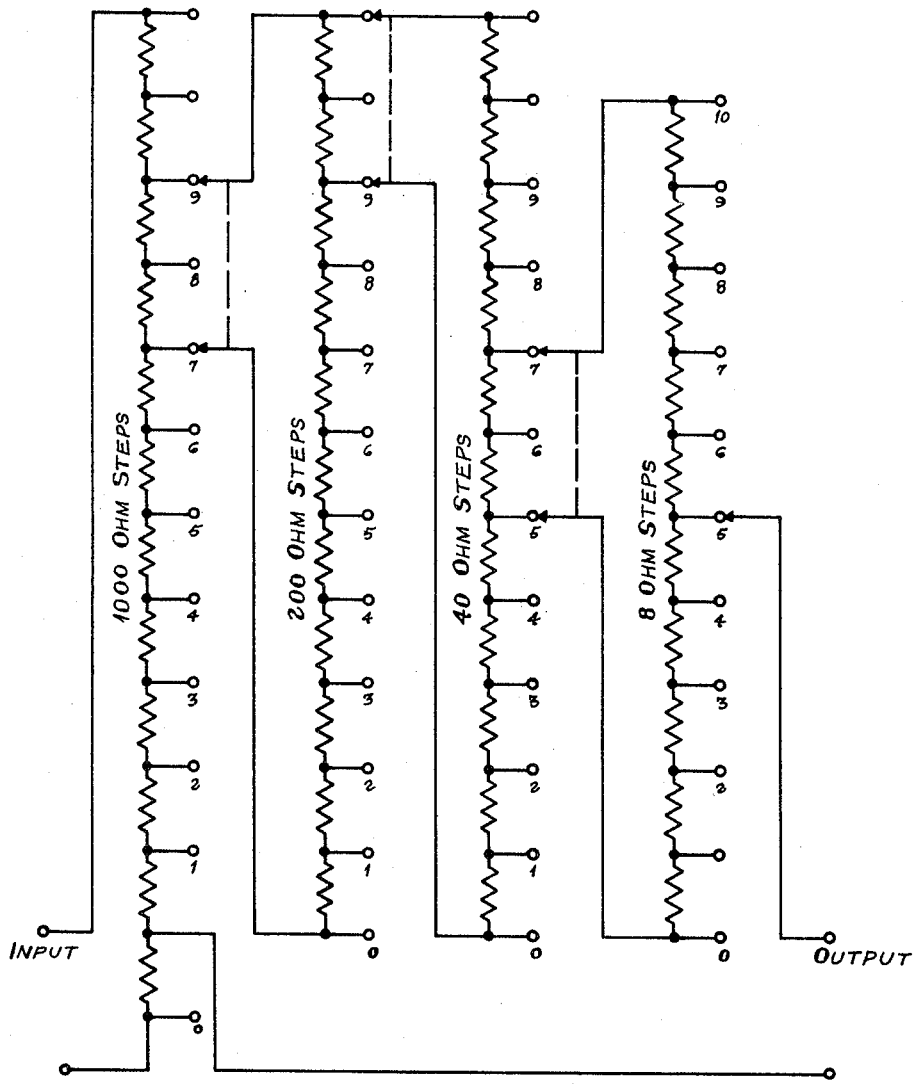

In the accompanying drawings:

FIG. 1 is a block diagram of an embodiment made in accordance with the principle of this invention, FIGS. 2 and 3 are block diagrams illustrating other embodiments made in accordance with the principle of this invention, FIGS. 4a and 4b are schematic diagrams of the voltage divider and associated circiuts made in accordance with the principle of this invention, FIG. 4c is a simplified schematic of the voltage divider network.

In the illustrated embodiment of FIG. 1 the signal whose harmonics are to be analyzed is recorded on some medium, as for example, a magnetic tape and is thereafter initially reproduced by an appropriate reproducer 10 into a time-frequency analyzer 11 via switch 12. This analyzer 11 indicates or determines the frequency components present on the recorded signal without any data indication of their respective amplitudes. A selected loop of recording medium or portion of the recorded signal is then prepared for accurate analysis and is placed on the recorder 10 for continuous repetitive reproduction. A logs duration of one minute has been found to render satisfactory results. The analyzer 11 is disconnected from the reproducer by means of switch 12 and its output is applied to the input 13 of wave analyzer 14. There are presently available wave analyzers of the superhetrodyne type in which the tuning thereof is accomplished by altering or changing the internal variable oscillator with a constant or fixed intermediate frequency to which the bandpass filters and amplifiers are tuned. One such wave analyzer which can and has been readily employed is manufactured by the Western Electric Company and is designated as GA-52794. The internal oscillator is inactivated and an external oscillator substituted therefor. This external oscillator 15 is a voltage controlled oscillator wherein its frequency output is proportional to the amplitude of an input D.C. voltage. In the alternative the wave analyzer internal oscillator can be modified to be voltage controlled.

The oscillator control voltage is obtained from a variable D.C. voltage source 16 which suitably can be a Hewlett-Packard Model 721A power supply or any equivalent of which there are a number available. The D.C. potential supplied by the source 16 is fed into a voltage divider where selected proportions of the input amplitude are applied at its output to the voltage controlled oscillator 15. Preferably the divider 17 should be of the Kelvin-Varley type which provides a high valued constant input resistance and an extremely accurate output voltage ratio.

A programmer means 18 supplies a control signal to the voltage divider 17, the reproducer 10 and to the counter 19 of the processing network 20. This signal synchronizes the cycling of the recording medium or tape with the rest of the circuits. Namely when the tape starts on a signal from the programmer means, the divider is set to provide a particular voltage to the VCO 15 and thus measures a particular harmonic while also initiating the count. When the end of the tape loop is reached the counter stops and is reset for the next counting period and harmonic which is started in synchronization by the programmer means 18. Additionally, the programmer controls the advance of the indicating means 21 so that the various harmonics are independently recorded along one axis as for example as shown at the indicating means 21.

The output of the analyzer 14 is applied to a processing network 20 which comprises in series a log converter 22, a voltage to frequency converter 23, a counter 19, and a digital to analog converter 24. This network effectively averages out the total energy at each harmonic for each run or play of the tape. This is necessary since the output at any one harmonic frequency for each play is not continuous but random. The output of the converter is fed into the indicating means 21 thereby permitting visual recordation of the converter 24 output.

Referring to FIG. 2 wherein there is illustrated another embodiment employing a stepping sequential switch 25 which acts in the capacity of a programmer means. These switches are well known and readily available in a variety of forms and types to suit a multiplicity of functions. In this application, for example, the switch would have at least a sufficient number of contacts to tap all the voltage ratios required to measure the harmonic frequencies of interest. The switch in sequence steps from one voltage ratio of the divider to another and thus the VCO 15 output is changed and the analyzer is progressively tuned to different harmonics. During the initiation of each step other taps on the switch 25 start the reproducer 10, advance the recorder 21 and control the count of the processing network 20. This simple sequence need only be dependent on the closure and opening of various contacts. As for example, the closing contacts at the switch 25 could energize relays at the reproducer 10, recorder 21 and network 20 and thereby commence and terminate their activity.

The embodiment illustrated in FIG. 3 differs from those previously described in that the automatic means for controlling the tuning of the analyzer has been changed to an electromechanical arrangement. The output voltage from the divider 17′ is applied to one input 26 of a voltage comparator 27. A servomotor 28 is affixed to the shaft 29 of the manual tuning dial of the analyzer 14′ while the frequency of the internal oscillator of the analyzer is sampled via line 30 and fed to converter 31. This converter 31, alters, in a known or fixed proportion, the input frequency to an output voltage. This exactly the reverse operation of the voltage controlled oscillator. The converter 31 output is applied to the other input 32 of comparator 27. The ouptut, at 33, of the comparator is proportional to the difference in the inputs or effectively constitutes an error signal. This error signal is applied to servomotor 28 via the servo-amplifier 34 and so the analyzer is effectively tuned by the voltage divider through the null seeking characteristic of the feedback network. All of the components described herein are commercially available and their specific selection would not be critical. The servomotor effectively folows, mechanically, the voltage supplied by the divider to track tune the analyzer in accordance with the preselected operation of the stepping switch 25′. The overall operation of the various embodiments will be discussed hereinafter with reference to only one embodiment since this explanation also applies to the other illustrated forms.

In the embodiment of FIG. 4 the voltage divider network 35 comprises four banks of series connected resistance elements. The first bank 36 being 1000 ohm resistors, the second 37—200 ohms, the third 38—40 ohms and the last 8 ohms. Each bank consists of 11 resistors except the last which has ten and dual ganged contact or paired digital thumbwheel switches which are designated by three symbols namely the switch, its number in column or harmonic and a bank identification. As for example the third column would be designated as S3 and if in the $10^{-3}$ bank then it would be S3e or f. Associated with each switch is a relay contact similarly designated. If for example a maximum of 24 harmonic are to be encountered then at least 24 switch pairs are provided for each bank of resistors. For the sake of clarity the voltage divider is shown in FIG. 4b in a simplified form with only one switch for each bank and with the relay contacts deleted. With the values of the resistors as indicated thereon the divider presents a constant input resistance of 10,000 ohms and division ratios of 10,000:1. Eleven equal resistors comprise the left or first bank decade. The next decade has resistors one-fifth the resistance of the first decade and bridges any selected pair of resistors in the first decade. Across the second decade is placed, therefore, one-tenth the potential of the input. Similarly, the third decade has units one-fifth the resistance of the second and is bridged across two resistors of the eleven in the second decade. The fourth decade is a conventional ten-step voltage divider. For each decade, the position of the bridge contacts can be varied by the switches anywhere between zero and full input voltage.

Referring now to FIG. 4a, the variable voltage source 39 is connected across the decade 36 and the output of the divider applied to the voltage controlled oscillator 40 which in turn controls the tuning of analyzer 41. The analyzer 41 receives its input or signal waveform to be analyzed from reproducer 42 and applies its output to the processing network 43. This network sequentially applies its output to the X–Y type recorder 44.

A mechanically timed sequence switch 45, or programmer, has a pair of contacts which short together the input lines 47 and 48. Line 47 is connected to a D.C. supply 49 via one section c of three position toggle switches S100 and the R$h$ relay contacts. All of these relay contacts and switch contacts are connected in parallel between the programmer 45 and the supply 49 so that only one set of relay and switch contacts need to be closed to provide a direct connection therebetween. This portion of the circuitry, as will be explained hereinafter, is employed to end the automatic cycling operation.

Line 48 of the timed switch 45 is connected to the supply 49 via normally open manual stepping switch 50 and also connected directly to the control element 51 of stepping switch 52. This switch is of the rotary type and has any number of stationary contacts 53 (depending on harmonics) and a rotatable contact arm 54. The arm 54 is alvanced in sequence by control element 51 from one contact to the next. Thus the D.C. supply 49 is connected via normally closed section $b$ of the toggle switches 100 to the rotatable arm 54 and thence to the relay R1 . . . R$n$ of that stationary contact. The three contact portion 100a, band c of toggle switch 100 are all ganged and their interrelation will be explained hereinafter.

Assuming that the switch 50 and the arm 54 are in the condition as shown with the toggle switch set with the c and b sections in closed position, the voltage from the supply 49 is applied via sections b of switch 100 to relay R1. The energization of relay R1 causes all the R1 contacts from a to h to close so that an output voltage ratio is developed depending on positions of the thumbwheel switches S1a–g. With relay contacts R1h closed, line 47 is energized therethrough and after a selected time these lines are momentarily connected by the timed switch or programmer 45 which causes arm 54 to be advanced via the action of controller 51 and the entire process is repeated for the R2 contacts. During each closure of one set of R contacts, the analyzer is tuned and measures a particular harmonic. When, however, the arm 54 is advanced the signal thereto is also applied to the reproducer to commence a replay, to the X–Y recorder to advance the same, and to the counter of the processing network 43. Thus the entire operation is both automatic and synchronized. It should be noted that the toggle 100 is a three position type switch having a "cal" position in which section $a$ of S100 switches is closed and sections $b$ and $c$ are open, a normal "operate" position in which section $a$ is open and $b$ and $c$ are closed and an "end of cycle" position in which sections $c$ and $a$ are open and $b$ is closed. There is a toggle 100 for each column or harmonic to be measured and each is capable of being set independently.

A clear understanding can be derived by the following operational explanation: Assuming that one has already time-frequency analyzed the waveform desired for analysis then only two initial settings are required since the harmonics to be measured have thereby already been selected. With the voltage divider set to provide at its output (to the VCO) the full value of the input, the variable voltage source is adjusted to an output value such that the analyzer is tuned to the highest harmonic to be measured. This is accomplished by setting say the last toggle switch to the "cal" position and the arm 54 to contact 24 by way of manual stepping switch 50 and then adjusting the source 39 so that the analyzer 41 is tuned to the highest harmonic. By setting the toggle switch 100 for the last harmonic to be measured so that its c section is open then the measurement will sequentially terminate with this harmonic.

With the last or highest harmonic set the other harmonics can be set with the thumbwheel switches of the divider without any further adjustment of the variable source 39.

As illustrated starting with the arm 54 of switch 52 in the position shown, D.C. supply 49, via normally closed switch sections S100b, arm 54 and contact 1 energizes relay R1 which closes the contacts of the thumbwheel switches in the first column and R1h. The closure of these last contacts completes the line providing the D.C. voltage from 49(1) to the switch 45. At the same time the divider 35 supplies the proper potential to the VCO which in turn tunes the analyzer 41 and the output thereof is eventually recorded at 44. After a selected time which is sufficient to allow the reproducer 42 to complete a play, the switch 45 momentarily closes its contacts. This provides a triggering pulse to the reproducer 42 to start another cycle of recording playback to the X-Y recorder 44 and network 43 to advance the X-Y recorder 44 and reset the counter. The pulse is also applied to stepping control 51 which causes arm 54 to be advanced to the next contact (i.e., 2) thereby energizing only relay R2 and its associated contacts. The analyzer 41 is now tuned in accordance with the setting of the second column of thumbwheel. It should be noted that switch 45 receives its D.C. supply via relay contacts R2h with all the other Rh contacts open. The entire automatic procedure is repeated until the contact arm 54 is rotated to last selected (end of cycle) contact for which the toggle switch 100n had been set so as to leave section c thereof open. The supply 49 is then open circuited or disconnected from the timed switch 45 and is not re-energized thereby terminating the operation.

When Relay R1 is energized, the contacts R1a through R1h will be closed; all other relay contacts will be open. Thus, only switches S1a through S1g will be connected into the voltage divider circuit.

The relays can be energized either of two ways: by means if the completion of a circuit through the stepping relay 51 or by means of the operation of any of the 24 control toggle switches, S101 through S124.

When the stepping relay is used to energize the relays, switches S101a through S124a are all open; switches S101b through S124b are all closed. Switches S101b through S124b are all wired in series; thus, when all the switches are closed, there will be a 24 v. D.C. potential on the stepping relay wiper arm 54.

When any one of the 24 switches S101a and b through S124a and b are operated, the 24 volt potential on the stepping relay contact arm 54 will be removed. One of the switches S101b through S124b will open the circuit. The relay will receive the 24 volts through the closure of any of the switches S101a through S124a.

The 24 volt pulse used to advance the stepping relay can be generated either by the momentary closure of switch S200 or by the momentary closure in an external programming device or mechanical timed switch 45.

When operating the system, usually less than 24 harmonics are measured. The combination of relay contacts R1h through R24h and switches S101c through S124c provide a means of holding the stepping relay after the last harmonic has been measured. Switches S101c through S124c are all normally closed.

If only two harmonics were to be measured, switch S102c would be placed in an open position. With the stepping switch in position 1, contact R1h will be closed. The external programming device can generate a 24 volt pulse because the circuit can be completed through R1h and S101c. When the stepping relay is in position 2, contact R2h will be closed, but as previously indicated S102c will be open. When the external programmer contact momentarily closes, a 24 volt pulse will not be generated because the 24 volt supply will be opened by S102c.

The functions of S101a, b, and c are all included in a single switch: When the toggle is in the upper position switches S101a and b will be respectively closed and open; in the lower position S101c will be opened. The switches will be in normal positions when the toggle is in the middle position. Switches S102 through S124 operate in the same manner. This corresponds to the "cal" "operate" and "end" positions of the toggle switches.

It will be understood that various changes in the details, materials and arrangements of parts (and steps), which have been herein described and illustrated in order to explain the nature of the invention, may be made by those skilled in the art within the principle and scope of the invention as expressed in the appended claim.

I claim:

1. Apparatus for automatically analyzing the harmonic frequency levels of a complex waveform signal which comprises:
   a recording medium having recorded thereon said complex signal and reproducing means for repetitively reproducing said complex signal,
   a wave analyzer tunable by an oscillatory signal and having its input connected to said reproducing means,
   a source of stable voltage,
   a stepped voltage divider means, connected to receive said stable voltage and providing a selectable output voltage proportion thereof,
   a voltage controlled oscillator having the output of said divider means connected to the input of said oscillator, and the output of said oscillator connected to said analyzer for tuning thereof,
   a processing network having connected therein, in series,
      a log voltage converter,
      a voltage to frequency converter,
      a digtal frequency counter,
      a digital to analog converter,
   and having the input of said network connected to the output of said analyzer,
   an X-Y recorder connected to receive the output of said programmer means and connected to said counter, said reproducing means, and said divider means,
whereby for each harmonic said programmer will commence said count and said reproducing means, and index said divider and recorder.

References Cited

UNITED STATES PATENTS

| | | |
|---|---|---|
| 2,970,469 | 2/1961 | Feldman. |
| 2,973,478 | 2/1961 | Hurvitz _____ 324—77 |
| 3,021,478 | 2/1962 | Meacham _____ 324—77 |
| 3,289,078 | 11/1966 | Ratz _____ 324—77 |

RUDOLPH V. ROLINEC, Primary Examiner.

P. F. WILLE, Assistant Examiner.